(12) United States Patent
Chen et al.

(10) Patent No.: US 7,970,974 B2
(45) Date of Patent: Jun. 28, 2011

(54) METHOD AND SYSTEM FOR ADDING OR REMOVING A LOGICAL UNIT OF A USB MASS STORAGE DEVICE

(75) Inventors: Wei Chen, Shanghai (CN); Xian Dong Meng, Shanghai (CN); Long Wen Lan, Shanghai (CN); Jian Xu, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 287 days.

(21) Appl. No.: 12/270,335

(22) Filed: Nov. 13, 2008

(65) Prior Publication Data

US 2009/0144477 A1 Jun. 4, 2009

(30) Foreign Application Priority Data

Nov. 29, 2007 (CN) .......................... 2007 1 0196185

(51) Int. Cl.
H05K 7/10 (2006.01)
G06F 3/00 (2006.01)

(52) U.S. Cl. ................ 710/302; 710/2; 710/10; 710/19; 710/301

(58) Field of Classification Search ............ 710/2, 8–10, 710/15, 19, 301–302, 304
See application file for complete search history.

(56) References Cited

U.S. PATENT DOCUMENTS

| | | | | |
|---|---|---|---|---|
| 6,131,134 A | * | 10/2000 | Huang et al. ................. | 710/302 |
| 6,141,719 A | * | 10/2000 | Rafferty et al. .............. | 710/316 |
| 6,651,154 B1 | | 11/2003 | Burton et al. | |
| 6,871,252 B1 | * | 3/2005 | Cline ........................... | 710/313 |
| 7,111,121 B2 | | 9/2006 | Oishi et al. | |
| 7,346,724 B1 | * | 3/2008 | Castleberry ................. | 710/306 |
| 2004/0236980 A1 | | 11/2004 | Chen | |
| 2005/0182615 A1 | * | 8/2005 | Kern ............................. | 703/24 |
| 2006/0095595 A1 | * | 5/2006 | Dalton et al. ................ | 710/5 |
| 2006/0123166 A1 | * | 6/2006 | Toebes et al. ............... | 710/106 |
| 2006/0184806 A1 | * | 8/2006 | Luttmann et al. ........... | 713/193 |
| 2007/0180167 A1 | * | 8/2007 | Tan et al. ..................... | 710/74 |
| 2007/0245055 A1 | * | 10/2007 | Minami ....................... | 710/305 |

FOREIGN PATENT DOCUMENTS

| | | |
|---|---|---|
| CN | 1877550 A | 12/2006 |
| CN | 1877550 A | 12/2006 |

OTHER PUBLICATIONS

Jungo Ltd, USB Software, PCI Software. [on-line] Mass StoraMass Storage USB Class/Function Driver: Overview. [retrieved Nov. 13, 2008] Retrieved from the Internet<URL: http://www.jungo.com/st/embedded_usb_mass_storage.html>.

Mass Storage USB Class Function Driver Overview, http://www.jungo.com/st/embedded_usb_mass_storage.html.

* cited by examiner

Primary Examiner — Thomas J Cleary
(74) Attorney, Agent, or Firm — H. Barrett Spraggins; Thomas E. Tyson; Biggers & Ohanian, LLP.

(57) ABSTRACT

A method and apparatus for adding or removing a logical unit of a mass storage device connected to a host computer through a universal serial bus (USB) interface are provided. The method may comprise: dynamically managing a logical unit table associated with the logical unit; generating a corresponding hot plug and play (PnP) event in the mass storage device; and informing the host computer of the hot PnP event. The mass storage device may comprise: a logical unit managing apparatus; a hot PnP event generating apparatus; and an informing apparatus for informing a host computer of the hot PnP event through a USB.

20 Claims, 11 Drawing Sheets

| Hot PnP Event Record ||||||||
|---|---|---|---|---|---|---|---|
| Bit 7 | Bit 6 | Bit 5 | Bit 4 | Bit 3 | Bit 2 | Bit 1 | Bit 0 |
| Hot PnP Event Type - 801 |||| Logical Unit Number - 802 ||||

Fig.8

| Layer \ Action | Firstly connecting | Removing logical units 2 and 4 | Adding a new logical unit 2 |
|---|---|---|---|
| SCSI Driver | Logical unit table: 0, 1, 2, 3, 4, 5 | Logical unit table: 0, 1, 3, 5 | Logical unit table: 0, 1, 2, 3, 5 |
| USB Mass Storage Driver | Report max LUN 5, in which logical unit table: 0, 1, 2, 3, 4, 5 | Report removal of 2, 4, in which logical unit table: 0, 1, 3, 5 | Report addition of 2, in which logical unit table: 0, 1, 2, 3, 5 |
| USB Mass Storage Device | Allocate sequential LUN for each logical unit, in which logical unit table: 0, 1, 2, 3, 4, 5 | Detect LUN 2 and 4 were removed, and produce a removal event, in which logical unit table: 0, 1, 3, 5 | Detect and allocate LUN for a new logical unit, and produce an adding event, in which logical unit table: 0, 1, 2, 3, 5 |

Fig.9

METHOD AND SYSTEM FOR ADDING OR REMOVING A LOGICAL UNIT OF A USB MASS STORAGE DEVICE

RELATED APPLICATION

This application claims priority under 35 U.S.C. §119 to Chinese Patent Application No. 200710196185.8 filed Nov. 29, 2007, the entire text of which is specifically incorporated by reference herein.

TECHNICAL FIELD OF THE INVENTION

The various embodiments described herein relate to a USB-based mass storage technique and particularly to a method for adding or removing a logical unit of a mass storage device, a mass storage device, a mass storage driver, and a mass storage system.

BACKGROUND OF THE INVENTION

The Universal Serial Bus (USB) Mass Storage Class is a set of computing communication protocols defined by the USB Implementers Forum (USB-IF) that run on the USB. The USB Mass Storage Class comprises two transport protocols: (1) USB Mass Storage Class Control/Bulk/Interrupt (CBI) Transport; and (2) USB Mass Storage Class Bulk-Only Transport. The USB Mass Storage Class further comprises the following subclass specifications: (1) USB Mass Storage Class ATA Command Block; (2) USB Mass Storage Class UFI Command Specification; (3) USB Mass Storage Class RBC Command Specification; (4) USB Mass Storage Class QIC-157 Command Specification; (5) USB Mass Storage Class SFF-8070i Command Specification; and (6) SCSI transparent command set. The aforementioned transport protocols define the transport methods of data, commands, and status information on the USB: The CBI Transport specification defines how to transmit data, commands, and status information by using Control, Bulk In/Out, and Interrupt endpoints, while the Bulk-Only Transport specification defines the way that data, commands, and status information are transmitted by only using a bulk endpoint. Most USB storage devices are designed based on the Bulk-Only Transport specification and the SCSI transparent command set. Bulk-Only Transport uses bulk transport in most communications and uses control transport only when clearing a stall condition on a bulk endpoint and when transmitting a class-specific request.

Usually, a storage device (e.g., a HDD) following the Bulk-Only Transport specification to be connected to a computer is called a USB mass storage device. Typically, a storage device communicating with a computer through the USB Bulk-Only Transport protocol is called a USB bulk-only mass storage device. Such devices are widely used in personal computers and embedded systems, such as a disk (e.g., USB disk, floppy disk, CD, DVD), a multi-function media card reader, a mobile phone, a camera, and a scanner.

A USB bulk-only mass storage device supports logical units that share common device characteristics. A logical unit may be a physical storage unit or a logical address space, each identified by a logical unit number (LUN).

FIG. 1 is a schematic diagram illustrating a USB mass storage system having a plurality of logical units. As shown in FIG. 1, a mass storage device 10 is connected to a host computer 15 through a USB bulk-only interface 11. The mass storage device 10 comprises local logical units 12 and remote logical units 13, which can be either physical devices, logical address spaces connected to the mass storage device through a network, other interfaces, or various virtualization techniques. In some applications, it may be necessary to dynamically add a new logical unit to the mass storage device or to dynamically remove an existing logical unit from it when the device is being used.

FIG. 2 is a structural block diagram illustrating a USB mass storage system. As shown in FIG. 2, the system comprises a USB mass storage driver stack 20 and a USB host controller 21 on a host computer (i.e., host) as well as a USB mass storage device 22. The mass storage driver stack 20 is of a multilayer structure. The lower layers of the USB mass storage driver stack 20 may include a USB controller driver 201 and a USB core driver 202, which are responsible for the transmission of the data on the USB bus. The USB core driver 202 provides a group of common interfaces for USB drivers to access and control the USB hardware (i.e., a host controller and a mass storage device) without having to worry about the type of USB host controller 21 used in the system. The middle layer of the USB mass storage driver stack 20 is a USB mass storage driver 203, which is responsible for implementing various subclass specifications and transport protocols, such as the typical SCSI transparent subclass specification and the Bulk-Only Transport protocol. The upper layer of the USB mass storage driver stack 20 is a storage medium access driver. For most USB bulk-only mass storage devices, specific storage medium access operations are generally implemented through SCSI commands; accordingly, the uppermost layer of the USB mass storage driver stack 20 is generally a SCSI driver 204. However, one skilled in the art can understand that, for different subclass specifications, the upper layers of a USB mass storage driver stack may have different drivers. The USB mass storage driver 203 contains device-specific configuration information and provides proper interfaces to an upper layer storage medium access driver (SCSI driver 204) to allow it to communicate with the USB mass storage device 22 via different subclass specifications and transport protocols. The USB mass storage driver 203 also needs to deliver the device information to an upper layer driver, which is a SCSI driver for most bulk-only devices. The SCSI driver 204 considers each valid logical unit as an independent storage resource. The SCSI driver 204 will create an internal SCSI device object for each logical unit and register for each device object an individual access point in a file system (e.g., /dev/scd* or /dev/sd* in a Linux system). Through such access points, user-mode applications can send operating requests to the SCSI driver 204, which in turn translates the operating requests into specific SCSI commands and transmits them to the USB mass storage driver 203 through internal SCSI device objects for ultimate arrival at the USB mass storage device 22.

In general, a normal boot process of a USB bulk-only mass storage device includes three levels of initializations:

1. Level 1—USB Core Driver Initialization

When a USB mass storage device is attached, the host USB core driver is responsible for assigning a unique address to device. The host also requests configuration information from the device to determine its capabilities and characteristics. The device may have one or more kinds of configurations. Within each configuration, the device may support a plurality of interfaces. An interface is a related set of endpoints that present a single feature or function to the host. A typical USB bulk-only mass storage device comprises a Default Control Pipe (endpoint 0) and a bulk-only interface.

2. Level 2—USB Mass Storage Device Class Initialization

The USB mass storage driver issues a class-specific request—"Get max LUN"—to the Default Control Pipe and determines the number of logical units supported by the device according to the returned result. The logical units of the mass storage device shall be numbered contiguously starting from LUN 0 to a maximum LUN of 15 (0x0F in hexadecimal). Furthermore, the USB mass storage driver shall allocate required resources, record corresponding information, and report the storage device to SCSI drivers.

3. Level 3—SCSI Layer Initialization

The SCSI drivers shall issue an inquiry command to each logical unit numbered from 0 to maximum LUN to complete the initialization procedure. Each logical unit is considered as an individual storage device, and the response to the inquiry command indicates the characteristics of these individual storage devices. Finally, the SCSI drivers will present all of the storage devices to the operating system.

In such manner, a USB bulk-only mass storage device accomplishes its boot process. Consequently, the logical units are rendered operational.

Although current USB technology allows USB device hot plug and play, the USB mass storage device according to the prior art does not support hot plug and play of its logical units. Generally, "hot plug and play" may refer to the ability to dynamically modify, remove, and/or add a component (e.g., a USB device or the logical units thereof) connected to a machine (e.g., a computing device) without substantially interfering with the interaction between the component and the machine.

FIGS. 3 and 4 are sequence charts illustrating the process of adding and removing the logical units of the mass storage device according to the prior art, respectively. As shown in FIGS. 3 and 4, when inserting logical units into the mass storage device or removing logical units from the mass storage device, the mass storage device must be disconnected from the USB bus. Once the host is notified that the mass storage device has been removed, the USB mass storage driver will inform the SCSI driver to remove all of the logical units. Then, the mass storage device reconfigures its own logical units and reconnects to the USB bus. The host reinitializes the device; the USB mass storage driver obtains the maximum number of logical units supported by the mass storage device through the "Get max LUN" request and reports it to the SCSI driver, which will transmit an inquiry command to each logical unit currently connected with the mass storage device in order to complete the initialization process. Such series of operations causes the host USB core driver to start a new boot process and to reinitialize all of the logical units after the addition or removal of logical units. Thus, currently running applications using these logical units are disrupted, although such applications may only communicate with the unchanged logical units and thus should not be interrupted in theory.

Since addition and removal of logical units in accordance with the prior art causes interruption of running applications, the performance, availability, and reliability of running applications may be seriously impacted. Thus, a more intelligent USB mass storage device is needed that can support the hot plug and play of its logical units.

SUMMARY OF THE INVENTION

In view of the aforementioned shortcomings of the prior art, the various embodiments described herein provide a method for adding or removing a logical unit of a mass storage device that supports hot plug and play of its logical units. Additionally, the various embodiments provide a mass storage device, a mass storage driver, and a mass storage system that support hot plug and play of logical units.

According to a first aspect of the various embodiments, a method is provided for adding or removing a logical unit of a mass storage device that is connected to a host computer (i.e., host) through a universal serial bus (USB) interface. The method may comprise: dynamically managing a logical unit table associated with the logical unit; generating a corresponding hot plug and play (PnP) event at the mass storage device in response to adding or removing the logical unit; and informing the host computer of the hot PnP event.

According to a second aspect of the various embodiments, a mass storage device with a plurality of logical units is provided. The mass storage device may comprise: a detecting apparatus for detecting whether addition of a new logical unit or removal of an existing logical unit has occurred; a logical unit managing apparatus for dynamically managing a logical unit table associated with logical units in response to adding a new logical unit or removing an existing logical unit; a hot PnP event generating apparatus for generating a corresponding hot PnP event in response to the added or removed logical unit; and an informing apparatus for informing the host computer of the hot PnP event through a USB. The mass storage device further may comprise a fault tolerating apparatus.

According to a third aspect of the various embodiments, a mass storage driver is provided. The mass storage driver may comprise: an event receiving apparatus for receiving from a mass storage device a hot PnP event related to adding a new logical unit or removing an existing logical unit through a USB; and an event processing apparatus for dynamically maintaining a corresponding logical unit table and informing a upper layer driver of the hot PnP event in response to the received hot PnP event. The mass storage driver further may comprise an event requesting apparatus for either periodically sending a request or sending a request in response to a command to the mass storage device in order to determine whether a hot PnP event exists.

According to the fourth aspect of the various embodiments, a mass storage system is provided. The mass storage system may comprise the aforementioned mass storage device and the aforementioned mass storage driver.

According to the fifth aspect of the various embodiments, a computer program product is provided. The computer program product may comprise computer-executable instructions that, upon being executed on a computing device, may configure the mass storage device to execute the aforementioned method.

BRIEF DESCRIPTION OF THE DRAWINGS

The objects, features, and advantages of the various embodiments described herein will become more apparent from the following detailed description of exemplary embodiments in conjunction with drawings, in which:

FIG. 8 provides a hot PnP event record of a hot PnP event according to an exemplary embodiment;

FIG. 9 is a comparison table illustrating the addition and removal of logical units of a mass storage device according to an exemplary embodiment;

DETAILED DESCRIPTION

Various embodiments will be described in detail in conjunction with the accompanying drawings.

Figure 1:
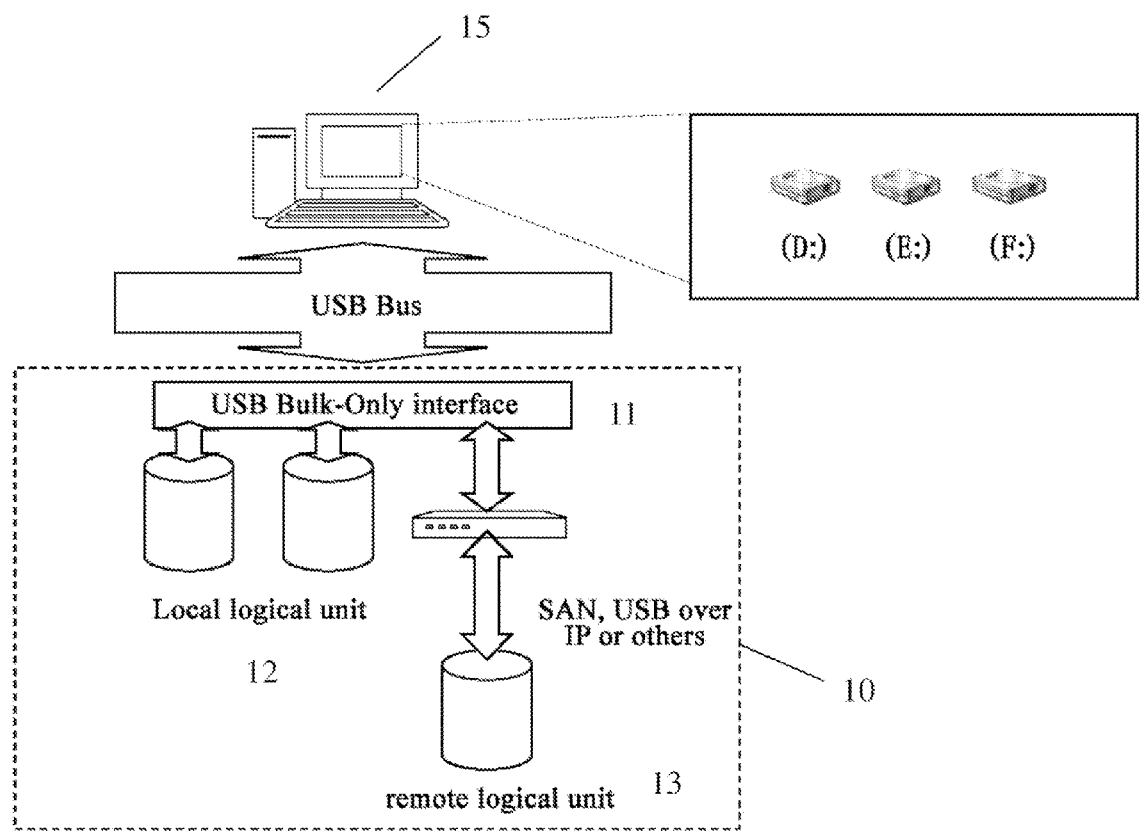
FIG. 1 is a schematic diagram illustrating a USB mass storage system having a plurality of logical units.
Figure 2:
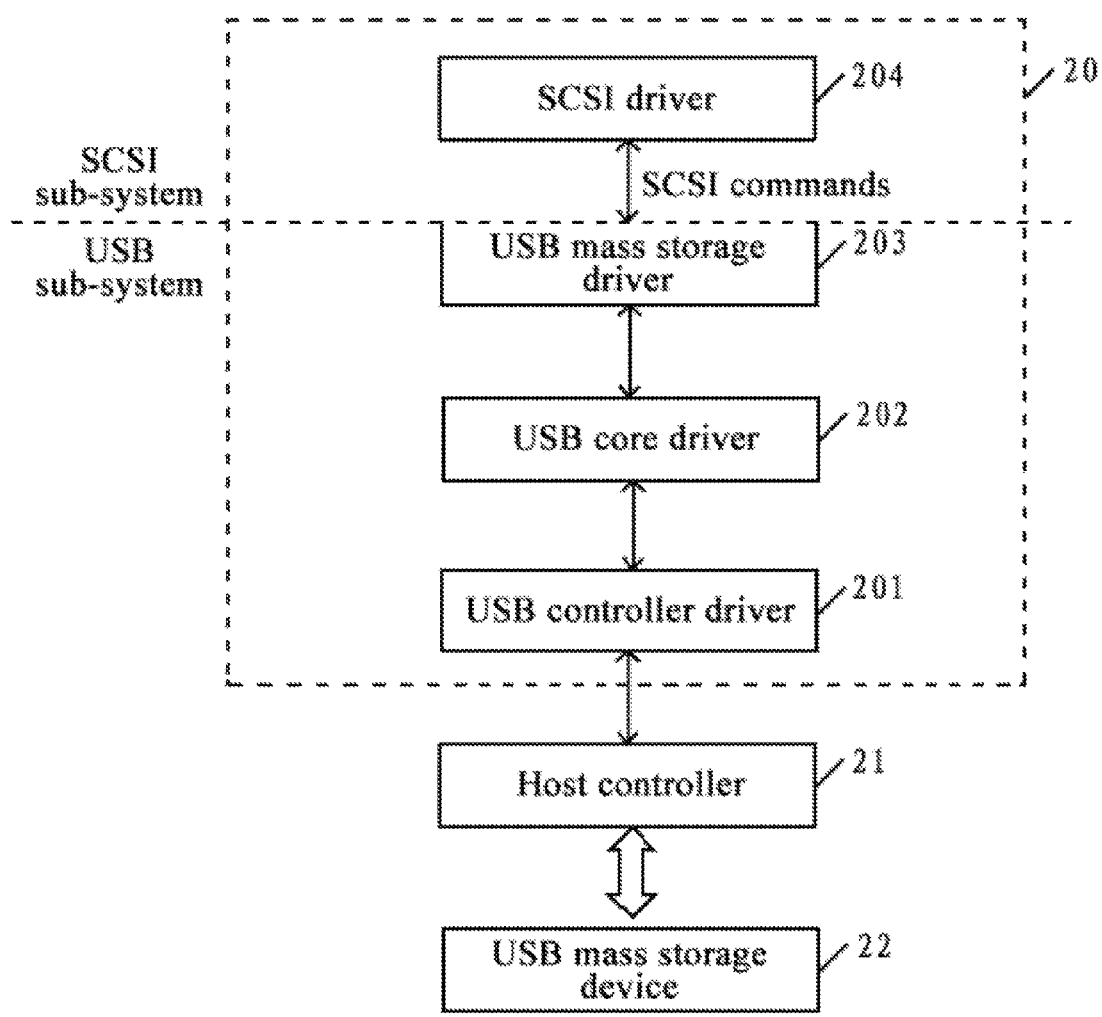
FIG. 2 is a structural block diagram illustrating a USB mass storage system.
Figure 3:
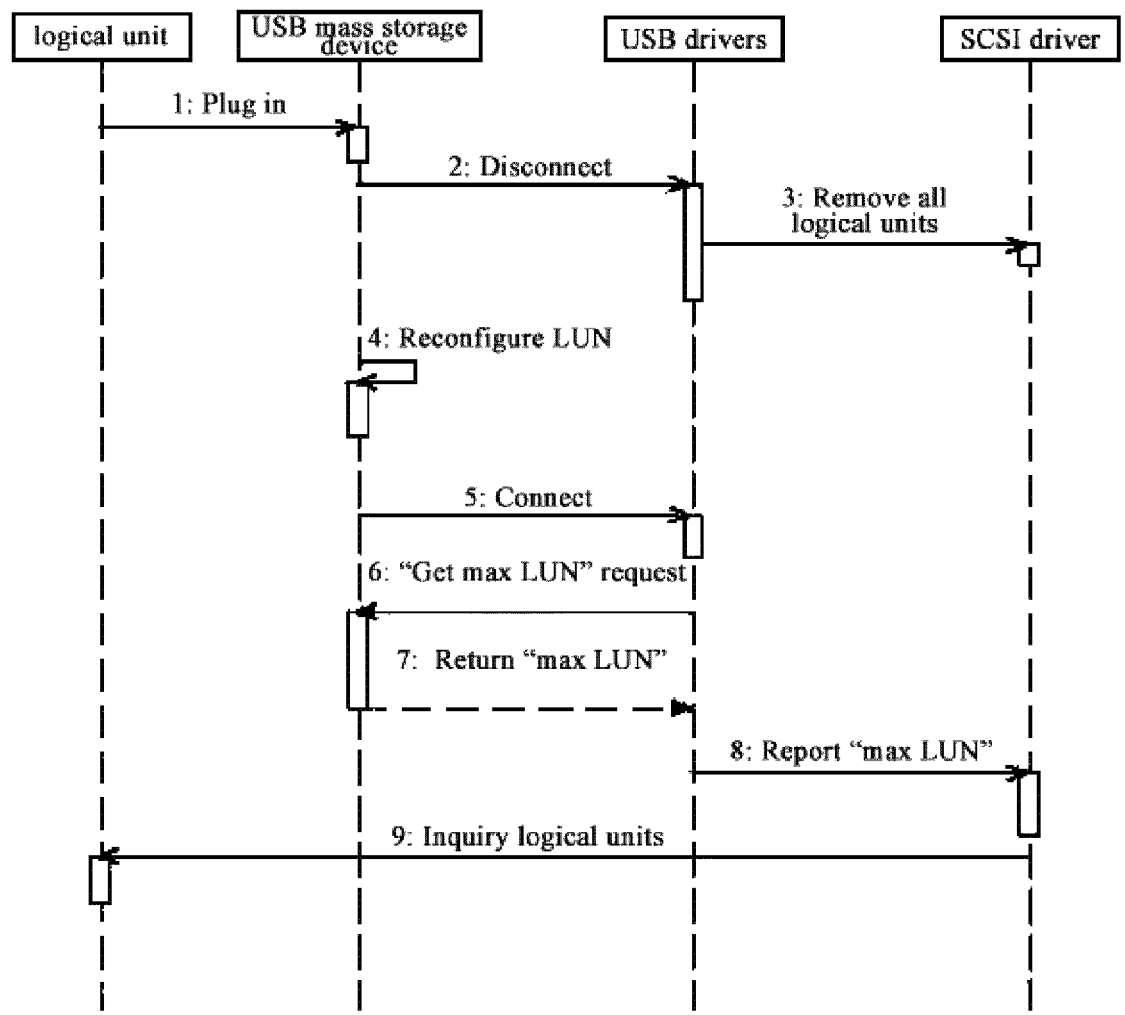
FIG. 3 provides a sequence chart of performing an adding operation on a logical unit of a mass storage device according to the prior art.
Figure 4:
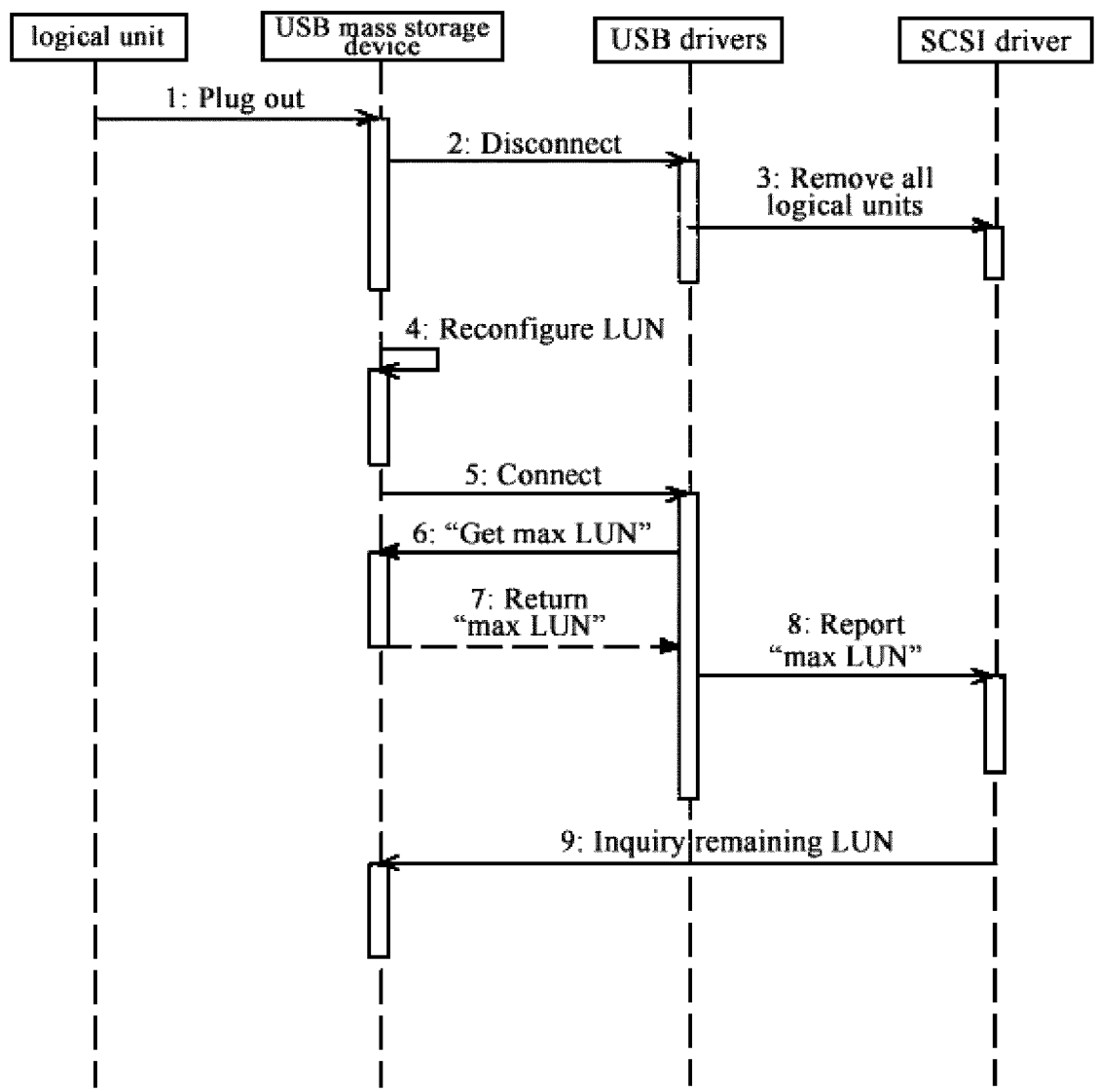
FIG. 4 provides a sequence chart of performing a removing operation on a logical unit of a USB mass storage device according to the prior art.
Figure 5:
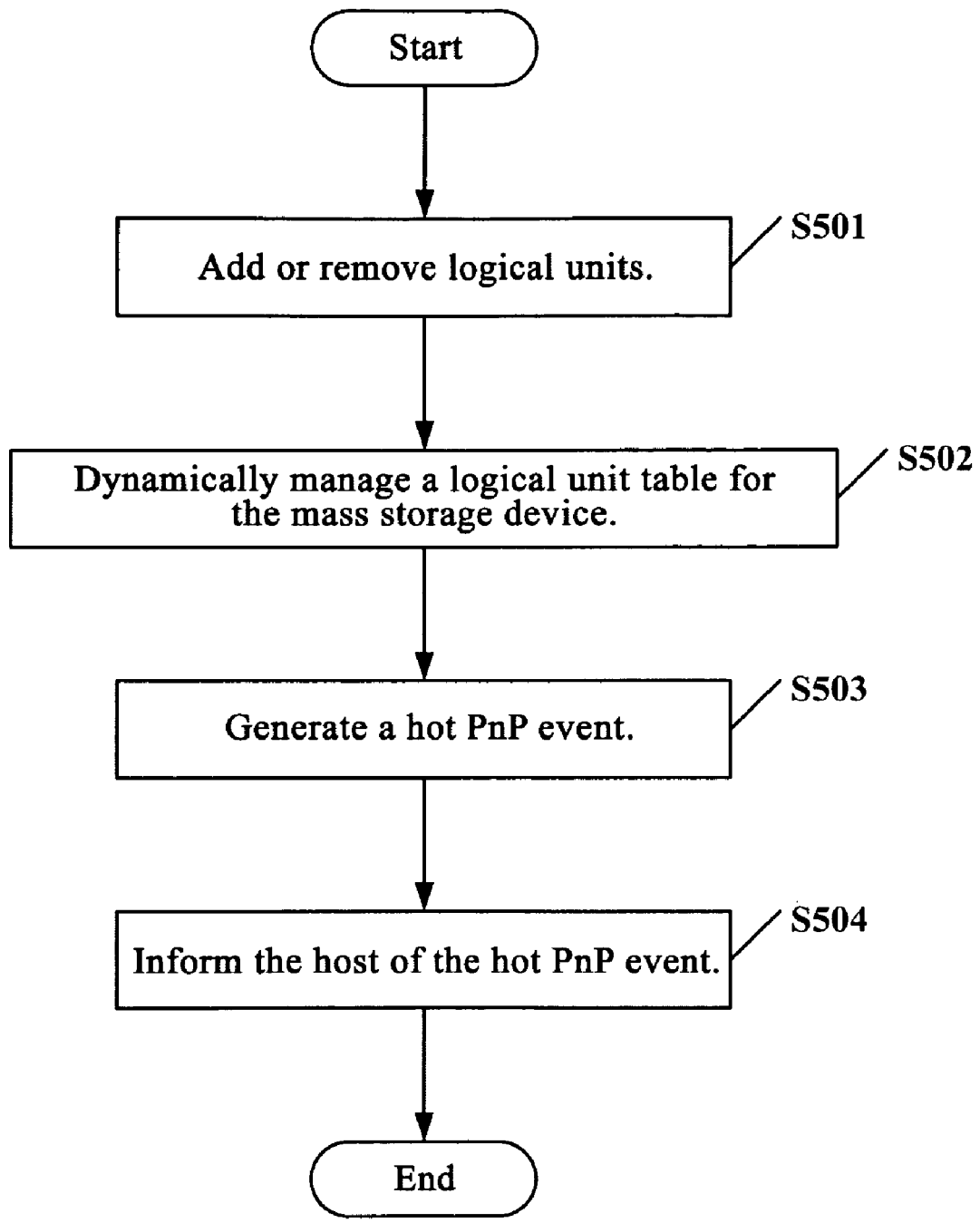
FIG. 5 provides a flowchart of a method for adding or removing a logical unit of a mass storage device according to an exemplary embodiment.

FIG. 5 is a flowchart showing a method for adding or removing a logical unit of a mass storage device according to an exemplary embodiment. This method may involve a mass storage device connected to a host computer (i.e., host) via a universal serial bus (USB) interface. The method may comprise: dynamically managing (modifying) a logical unit table associated with the logical unit; generating a corresponding hot plug and play (PnP) event at the mass storage device in response to adding a new logical unit or deleting an existing logical unit of the mass storage device; and informing the host computer of the hot PnP event.

As shown in FIG. 5, in step S501, it may be detected whether a new logical unit is added to or an existing logical unit is removed from a mass storage device. In step S502, in response to such addition or removal, the logical unit table of the mass storage device may be dynamically managed. The logical unit table may be used for recording each existing activated logical unit of the mass storage device by using an identifier such as a logical unit number (LUN), thus reflecting the variation of the logical units of the mass storage device. For example, the logical unit table may be managed based on LUN. In such case, when adding a logical unit, a LUN may be added to the logical unit table of the device, and when deleting an existing logical unit, the LUN associated with the logical unit may be removed from the logical unit table. Thus, by using the logical unit table, dynamic management of logical units may be implemented. Moreover, by using the logical unit table, the dynamic changes of a logical unit interface to the host system may be managed by using a single LUN to refer to distinct devices at different times. For example, the LUN 3 may represent a first device (e.g., a USB DVD driver) at one point in time but may represent a second device (e.g., a USB compact flash driver) at another point in time.

Next, in step S503, a hot PnP event associated with a logical unit may be generated by the mass storage device. Finally, in step S504, the host computer may be informed of the hot PnP event by the mass storage device.

Figure 6:
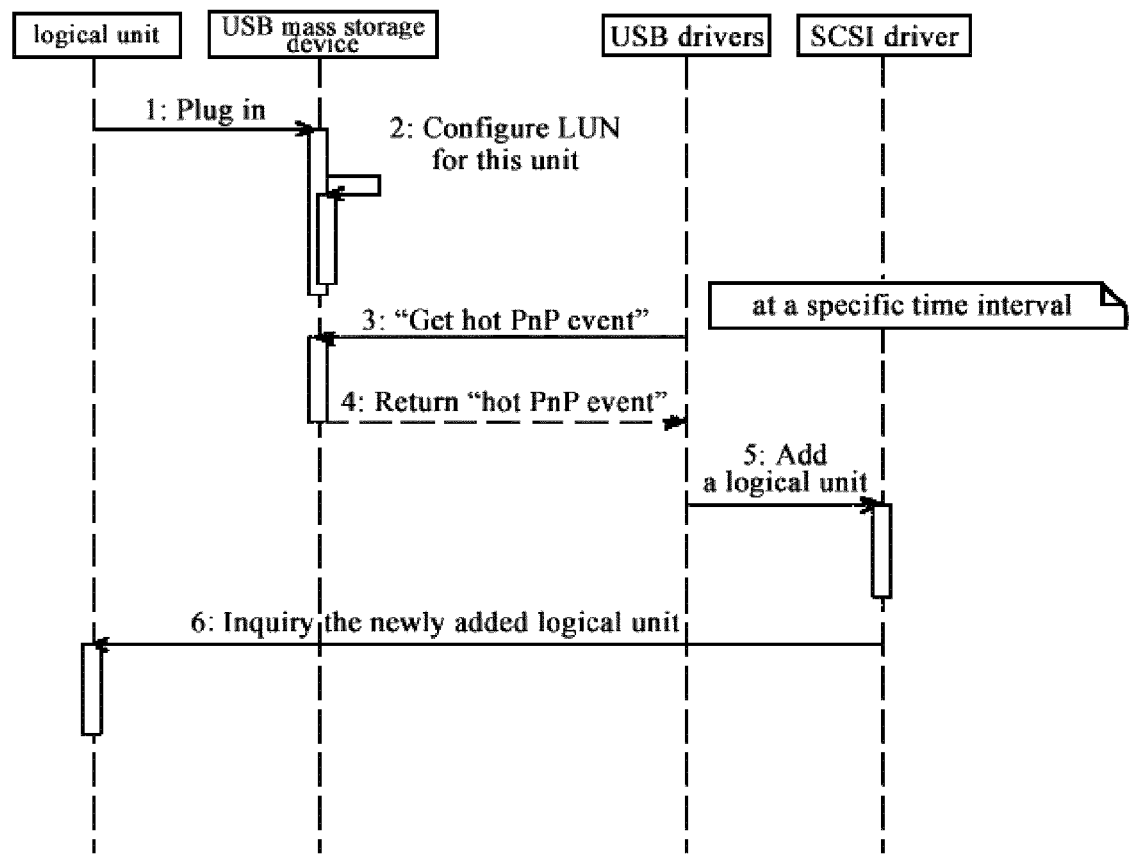
FIG. 6 provides a sequence chart of performing an adding operation on a logical unit of a mass storage device according to an exemplary embodiment.

FIG. 6 shows a sequence chart of the process of adding a logical unit to a USB mass storage device according to an exemplary embodiment. As shown in FIG. 6, when a new logical unit is added, the USB mass storage device first may allocate a new LUN to the new logical unit in its logical unit table and may generate a corresponding hot PnP event indicating the addition. The generated hot PnP event indicating addition may be an event record to be stored by the USB mass storage device, as will be discussed herein. A USB mass storage driver, which may maintain its own logical unit table, may send a "Get hot PnP event" request to the USB mass storage device periodically at a specific time interval. The request may be used to determine whether a hot PnP event exists in the USB mass storage device, and if so, the mass storage device may send a corresponding hot PnP event as a response. One skilled in the art can understand that it is also within the scope of the disclosure to obtain a hot PnP event in other ways. For example, when a certain condition arises (e.g., a host receives a certain status command), the host may send a "Get hot PnP event" request to the mass storage device through a mass storage driver non-periodically (e.g., the host may send a request in response to a command). According to an exemplary embodiment, if a plurality of events exists, one event may be reported at a time, or a plurality of events may be reported at a time, depending on the specific implementation. When a plurality of hot PnP events exists, the hot PnP events may be reported to the USB mass storage driver in the time sequence in which the events occur. Once the USB mass storage driver detects that a new logical unit has been added, a logical unit table maintained by the USB mass storage driver may be modified accordingly, and the USB mass storage driver may report the addition to a SCSI driver. The SCSI driver may perform an initialization process on the new logical unit individually and may report it to the operating system. In such process, other logical units may remain unchanged. In this way, hot PnP of the logical units of the mass storage device may be implemented.

Figure 7:
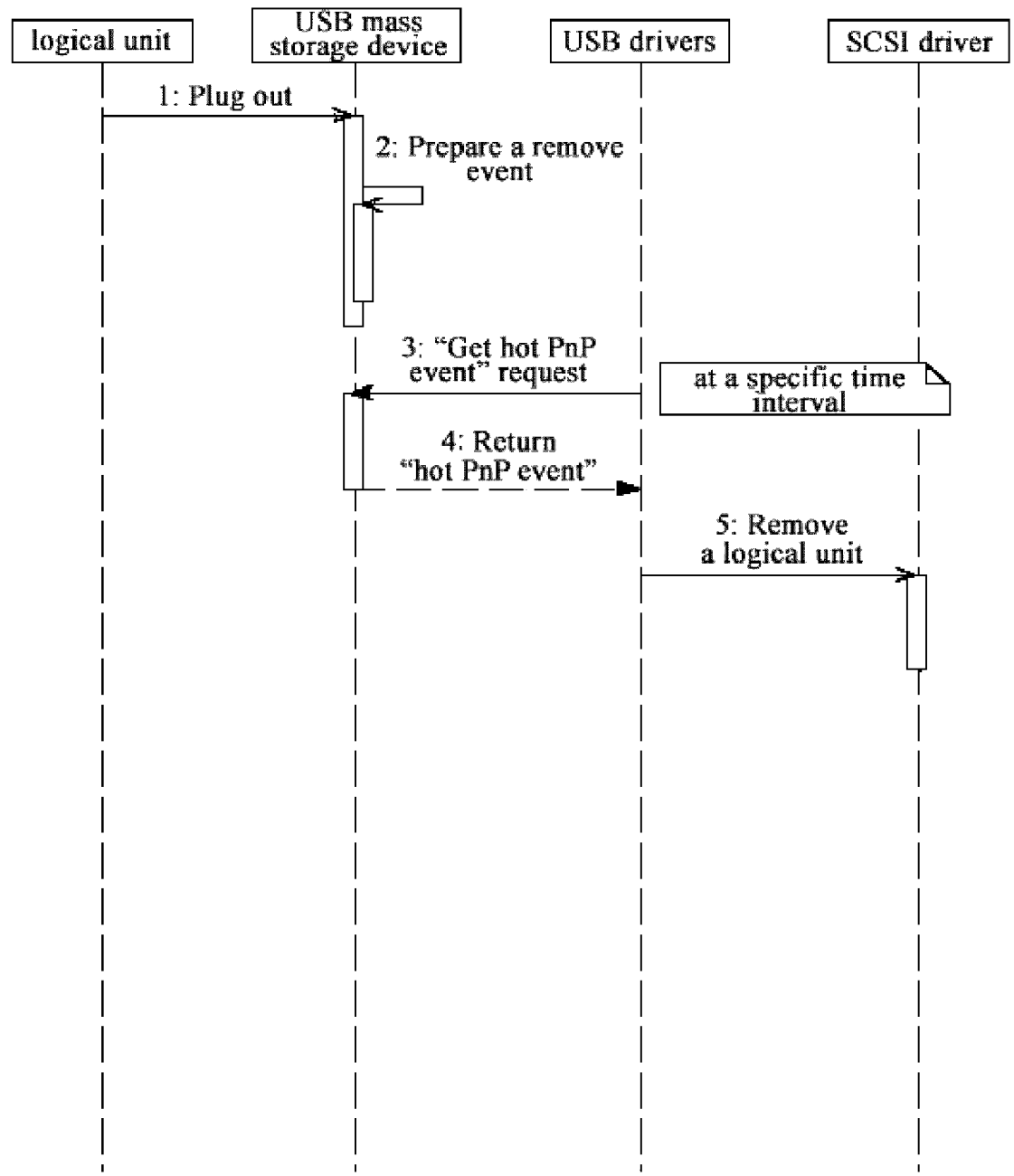
FIG. 7 provides a sequence chart of performing a removing operation on a logical unit of a mass storage device according to an exemplary embodiment.

FIG. 7 shows a sequence chart of the process of removing a logical unit from a USB mass storage device according to an exemplary embodiment. As shown in FIG. 7, similar to adding a logical unit, if a logical unit is removed, the USB mass storage device may remove the LUN of the logical unit from its logical unit table and may generate a corresponding hot PnP event indicating the removal. The generated hot PnP event indicating removal may be an event record to be stored by the USB mass storage device, as will be discussed herein. A USB mass storage driver, which may maintain its own logical unit table, may determine whether a hot PnP event exists through a "Get hot PnP event" request sent periodically to the USB mass storage device at a specific time interval. Such request also may be sent non-periodically to the USB mass storage device (e.g., in response to the host receiving a certain status command) When the USB mass storage driver obtains a hot PnP event, a logical unit table maintained by the USB mass storage driver may be modified accordingly, and the USB mass storage driver may inform the SCSI driver to release all resources related to the removed logical unit in the operating system.

In an exemplary embodiment, so long as a new logical unit is added or an existing logical unit is removed, a USB mass storage device supporting hot PnP logical units may produce a hot PnP event record of the addition or removal and may push the event record into its local event FIFO queue. The USB mass storage device should not remove a hot plug and play event record from its local FIFO queue until the host computer sends a "Get hot PnP event" request through the mass storage driver inquiring whether a logical unit addition or removal has occurred or until the host resets the USB mass storage device. In the case that the host resets the USB mass storage device, all of the PnP event records may be cleared.

The USB mass storage driver of the host computer may send a "Get hot PnP event" request to the default control pipe of the USB mass storage device at a specific time interval (e.g., 1000 ms). Once the USB mass storage device receives this request, it may check whether its FIFO queue is empty. If the queue is not empty, the USB mass storage device then may fetch a hot PnP event record from the head of the queue and may return it as a response to the request to the host computer. The format of the response to the request may be as follows: the first byte may indicate the number of hot PnP event records, and one or more hot PnP event records may follow. If the queue is empty, a response may be returned indicating that there are no available hot PnP events. For example, if the queue is empty, then the first byte may be set to '0'.

FIG. 8 illustrates the format of a hot PnP event record according to an exemplary embodiment. The record comprises at least the following information: event type and LUN. An event type field 801 may be used to indicate that a new logical unit has been added or that a certain existing logical unit has been removed. A LUN field 802 may be used to indicate which logical unit has been added or removed.

FIG. 9 is a comparison table illustrating the variation of logical units of a mass storage device according to an exemplary embodiment. As shown in FIG. 9, when a USB mass storage device is connected for the first time, if it has 6 logical units, then the device may allocate consecutive LUNs to the logical units in its logical unit table, such as 0, 1, 2, 3, 4, and 5. Similarly, after obtaining the maximum LUN possessed by the device, a USB mass storage driver may report to a SCSI driver that the maximum LUN is 5 (i.e., there exists a total of six logical units with LUNs 0-5). The USB mass storage driver and the SCSI driver may complete an initialization enumeration process and also may maintain their own logical unit tables, with the LUNs of their logical unit tables being consecutively allocated 0, 1, 2, 3, 4, and 5.

When removing logical units 2 and 4 from the USB mass storage device, the device may detect such removals and in response may remove the LUNs 2 and 4 associated with the logical units from its logical unit table, which now may have the LUNs 0, 1, 3, and 5, and may generate hot PnP events indicating removal of these logical units, such as hot PnP event records. In such case, the USB mass storage driver may obtain the hot PnP events by way of request-response, may modify its own logical unit table so that the LUNs 2 and 4 are removed and so that as a result the LUNs 0, 1, 3, and 5 may remain, and may report to the SCSI driver that the logical units 2 and 4 have been removed. Accordingly, the SCSI driver may process its logical unit table so that as a result the LUNs 0, 1, 3 and, 5 may remain.

When adding a new logical unit 2 to the USB mass storage device, the device may detect such addition and in response may allocate a LUN to the new logical unit in the logical unit table, which now may have the LUNs 0, 1, 2, 3, and 5, and correspondingly may generate a hot PnP event indicating the addition of a new logical unit, such as a hot PnP event record. In a similar manner to a logical unit removal operation, after obtaining the event record by way of request-response, the USB mass storage driver correspondingly may modify its own logical unit table so that the table now may have the LUNs 0, 1, 2, 3, and 5 and may report to the SCSI driver that a new logical unit 2 has been added. Accordingly, the SCSI driver may process its logical unit table, which also now may have the LUNs 0, 1, 2, 3, and 5.

Figure 10:
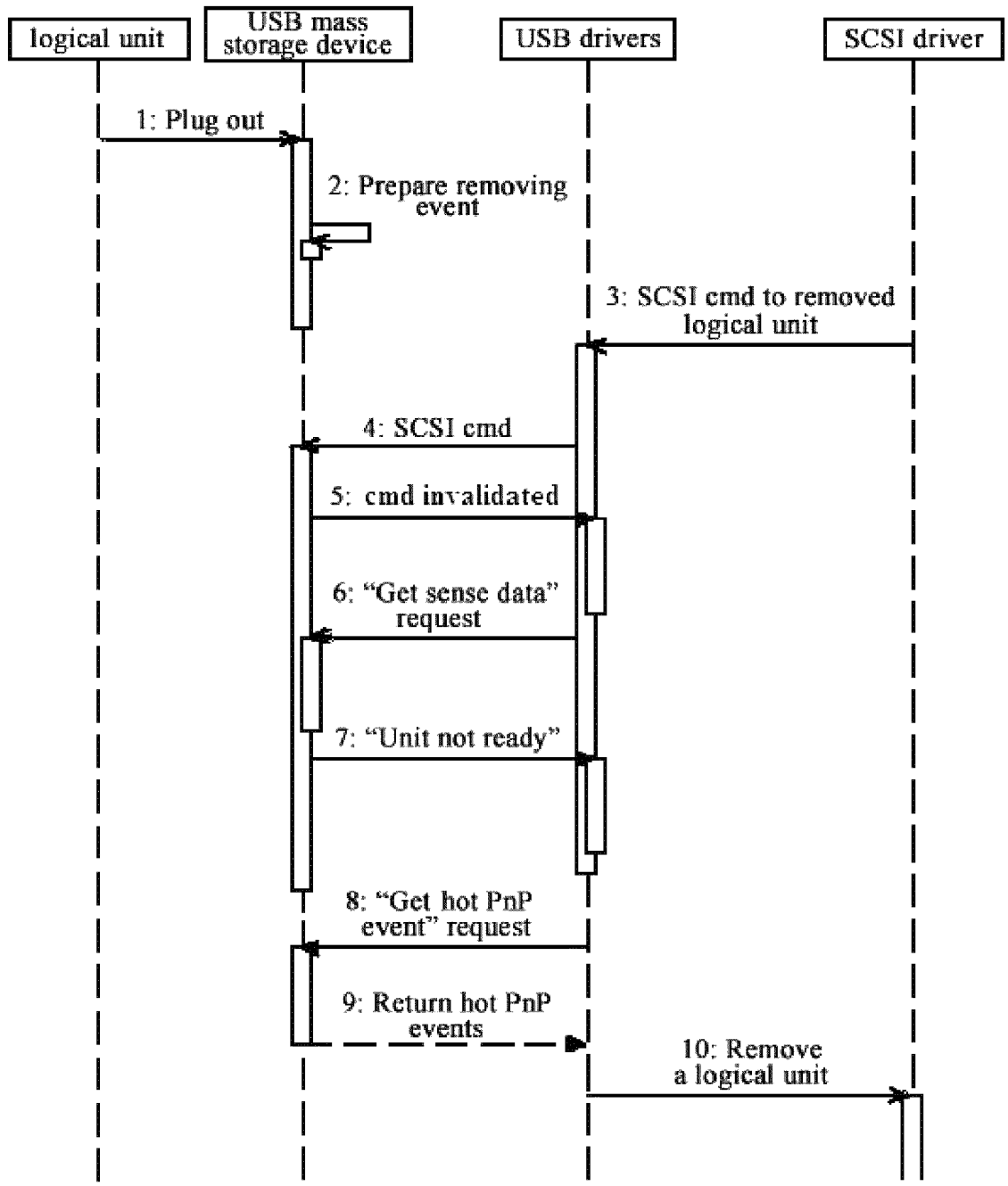
FIG. 10 provides a sequence chart of how to process commands from a host after removing a logical unit according to an exemplary embodiment.

There may be a relatively small time interval between the time at which a logical unit is removed from the USB mass storage device and the time at which the host computer detects the hot PnP event through the USB mass storage driver. The host computer may continue sending a SCSI command to the removed logical unit during such time interval. FIG. 10 illustrates a sequence chart of how a command from the host may be processed after removing a logical unit according to an exemplary embodiment. The USB mass storage device may generate a hot PnP event in response to removing the logical unit. If the SCSI driver continues to send SCSI commands to the removed logical unit before the host obtains the hot PnP event, for each SCSI command the USB mass storage device may detect the command; may set the status of the command to "detecting status"; may invalidate the command; and may generate sense data (detailed information) regarding the invalidation of the command. When the host computer receives the SCSI status information regarding the invalidated command, the USB mass storage driver may send a "Get sense data" command to inquire information regarding the specific invalidated command. The USB mass storage device may respond by sending the generated information regarding the invalidated command; specifically, the USB mass storage device may respond with "Unit not ready" sense data. The status may continue until the USB mass storage driver detects the hot PnP event and stops sending a SCSI command to the logical unit.

In addition, when the host receives this kind of status information indicating that a problem exists, the host may send a "Get hot PnP event" request to the USB mass storage device via the USB mass storage driver in order to obtain a timely hot PnP event.

Figure 11:
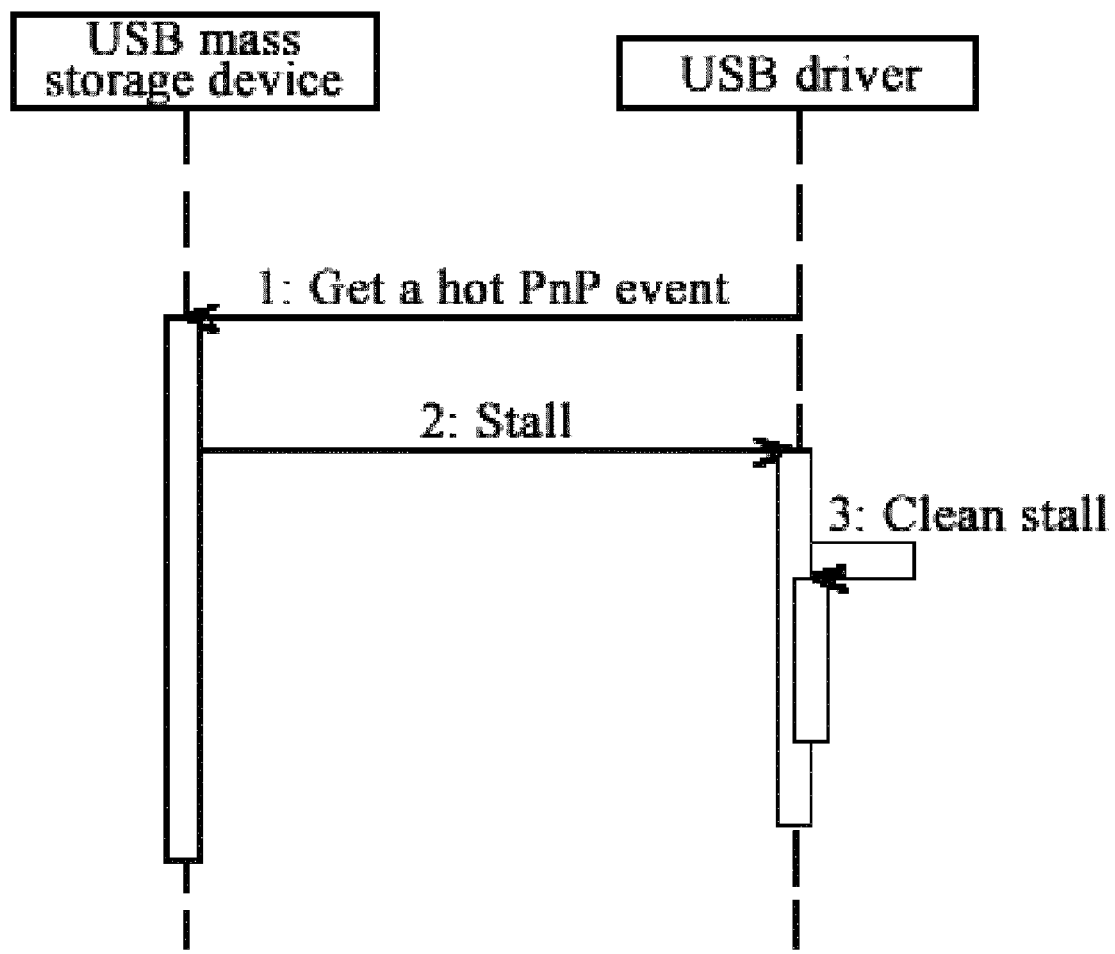
FIG. 11 provides a sequence chart of an operation compatible with an existing mass storage device according to an exemplary embodiment.

FIG. 11 shows a sequence chart of an operation compatible with an existing mass storage device according to an exemplary embodiment. This exemplary embodiment may address the case in which an existing USB mass storage device not supporting hot PnP of a logical unit receives a "Get hot PnP event" request in a default control channel. According to the USB protocol, the existing USB mass storage device may immediately stall the default control channel for an unknown request, setting the channel to a stall status, and may clear the stall status before the next request arrives. Accordingly, the USB mass storage driver in the host may learn that the device is an existing USB mass storage device that does not support hot PnP of a logical unit and accordingly may refrain from sending a "Get hot PnP event" request again. Subsequent operation may follow the initial flow.

In an exemplary embodiment, the LUNs of the mass storage device may be consecutive after the initialization and may become non-consecutive (i.e., sparse) after any hot PnP event. Referring back to FIG. 9, after removing logical units 2 and 4, the remaining activated LUNs are 0, 1, 3, and 5. If the host sends a "Get max LUN" request to the device in this case, then the device may maintain the original sense defined by USB bulk-only mass storage device protocol and accordingly may provide a response indicating that the maximum LUN is 5. To address a scenario in which one or more commands are lost such that the logical unit tables maintained by the USB mass storage driver and the SCSI driver do not accurately reflect the logical units of the mass storage device, a "Get existing bitmap" command may be provided. Such command may enable the host to obtain the existing LUN bitmap of activated logical units, and thus the proper status of logical units may be obtained by the host even if one or more commands are lost. For example, 16-bit data may be returned in response to the status request, and each bit may represent a LUN activated at the time of the "Get existing bitmap" command.

In another exemplary embodiment, LUNs may be kept consecutive, which is consistent with the original definition of the bulk-only subclass specification of the USB mass storage device class. In such case, when adding a logical unit, the host may assign a corresponding LUN to the added logical unit. Specifically, such newly-assigned LUN may be the new maximum LUN. When removing a logical unit, the LUNs of the remaining logical units may be reassigned as necessary so that the LUNs are arranged sequentially. For example, if the LUN of the removed logical unit is not the maximum LUN at the time of removal, then the LUNs of the remaining logical units that had been subsequent to the removed logical unit (i.e., that had been assigned higher LUNs than the removed logical unit) may be moved forward so that the LUNs are arranged sequentially. For example, focusing on the removal of the logical units 2 and 4 in FIG. 9, after the logical units 2 and 4 of the device are removed, the LUNs should be adjusted to 0, 1, 2 and 3 if the LUNs are to be kept consecutive. The process to keep the LUNs consecutive will be described in detail below.

In the case that the LUNs are kept consecutive, the LUN that is used by the hot PnP event record of a logical unit generated by the mass storage device may be the LUN at the time the event occurs. For example, if the device has logical units 0, 1, 2, 3, 4, and 5 and if logical units 2 and 5 are removed, then two hot PnP events may be generated reflecting the removal of logical unit 2 and the removal of logical unit 5. In the meantime, the bulk-only endpoint is may be stalled, and subsequent SCSI commands may be suspended. After the host detects a stall status, it may send on its own initiative a "Get hot PnP event" request at a default control channel (i.e., endpoint 0) to fetch back the two hot PnP events. At this time, the USB mass storage driver of the host may learn that logical units 2 and 5 have been removed, may move logical units 3 and 4 forward immediately to become logical units 2 and 3 respectively, and in the meantime may adjust the destination LUNs in the SCSI commands waiting in a queue. For example, the LUN sent to logical unit 3 originally now may be logical unit 2. Next, the SCSI driver may be informed to release the SCSI device objects originally corresponding to logical units 2 and 5 and to move LUNs stored in the SCSI device objects originally corresponding to logical units 3 and 4 forward to logical units 2 and 3 respectively. Finally, the USB mass storage device may be informed through the default control channel to clear the bulk-only status, and thus the suspended SCSI commands may continue to be executed. If the returned result for the "Get hot PnP event" request is that no hot PnP event occurs after the bulk-only endpoint is stalled, then at this time other exceptions may occur. Subsequent operations may follow the original flow.

In sum, the case in which a logical unit is removed and the existing LUNs are not changed in order to keep them consecutive is relatively simple. Neither the bulk-only endpoint needs to be stalled, nor does the destination LUNs in the SCSI commands waiting in a queue need to be adjusted. In such case, the "Get max LUN" request is kept in the embodiment, but the "Get existing bitmap" command may not be needed. However, in the case in which a logical unit is removed and the LUNs of the remaining logical units are changed in order to keep them consecutive, the mass storage device needs to update the LUNs of the logical units that are not removed in order maintain proper synchronization with the USB mass storage driver and in order to keep the logical unit tables consistent.

Figure 12:
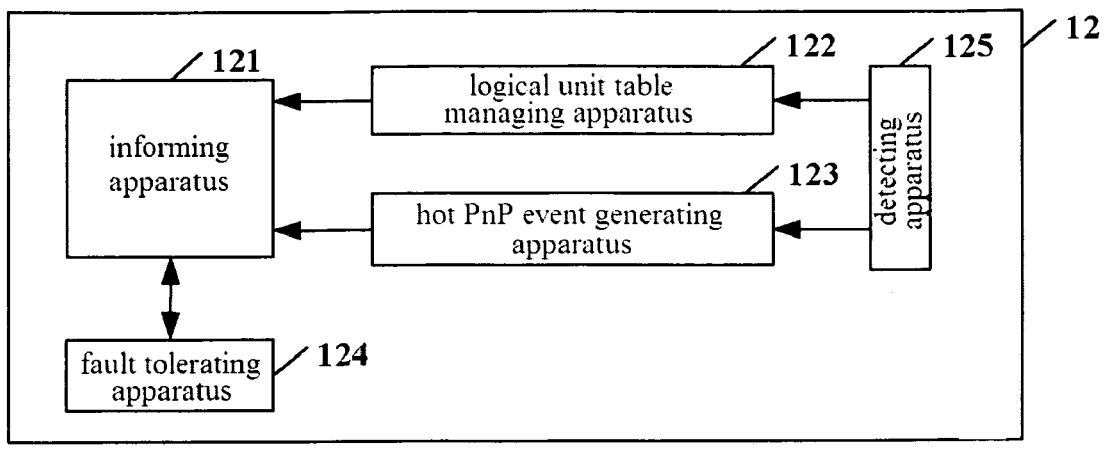
FIG. 12 is a block diagram providing a mass storage device according to an exemplary embodiment.

FIG. 12 provides a structural block diagram of a mass storage device according to an exemplary embodiment. As shown in FIG. 12, a mass storage device 12 having a plurality of logical units may comprise: a detecting apparatus 125 for detecting whether addition of a new logical unit or removal of an existing logical unit has occurred; a logical unit table managing apparatus 122 for dynamically managing a logical unit table associated with logical units in response to adding a new logical unit or removing an existing logical unit; a hot PnP event generating apparatus 1 23 for generating a corresponding hot PnP event for the added or removed logical units; and an informing apparatus 121 for sending the hot PnP event to the host computer through a USB.

The mass storage device 12 further may comprise a fault tolerating apparatus 124 for, when detecting a command sent to a removed logical unit, setting status information in the mass storage device, invalidating the command, generating information on the invalidated command, and sending the information on the invalidated command to the host computer through the informing apparatus 121.

In an exemplary embodiment, the logical unit table managing apparatus 122 of the mass storage device 12 may be configured to allocate a new LUN to an added logical unit in the logical unit table or to remove a LUN associated with the removed logical unit from the logical unit table.

The hot PnP event generating apparatus 123 of the mass storage device may be configured to generate a hot PnP event record associated with a hot PnP event when a logical unit changes, wherein the hot PnP event record includes at least an event type and a LUN. Moreover, the informing apparatus 121 may be configured to send the hot PnP event record to the host computer. Furthermore, the informing apparatus 121 may be configured to send a hot PnP event generated by the hot PnP event generating apparatus 123 to the host computer in response to the request of the host computer.

In addition, the informing apparatus 121 may be configured to send a hot PnP event to the host computer in response to the requests sent by the host computer periodically at a specific time interval. The informing apparatus 121 may also respond to a "Get hot PnP event" request sent by the host computer non-periodically (e.g., a request sent in response to a command) when a certain condition is satisfied (e.g., a status command is received).

Figure 13:
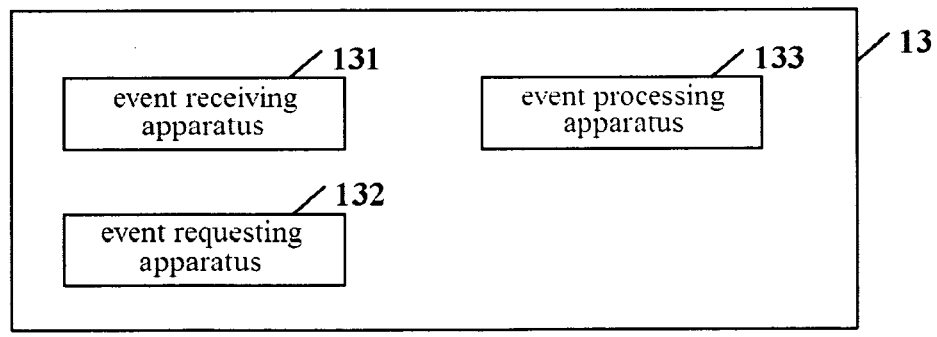
FIG. 13 is a block diagram providing a mass storage driver according to an exemplary embodiment.

FIG. 13 is a functional block diagram providing a mass storage driver according to an exemplary embodiment. As shown in FIG. 13, a mass storage driver 13 of the exemplary embodiment may comprise: an event receiving apparatus 131 for receiving from the mass storage device 12 a hot PnP event related to adding or removing logical units through a USB; and an event processing apparatus 133 for dynamically maintaining a corresponding logical unit table and informing an upper layer driver of the received hot PnP event. The event receiving apparatus 131 may be configured to receive the hot PnP event in the form of an event record, and the hot PnP event record may comprise at least an event type and a LUN. The mass storage driver 13 further may comprise an event requesting apparatus 132 for either periodically sending a request or sending a request non-periodically in response to a command to the mass storage device 12 so as to determine whether a hot PnP event exists.

In response to the event receiving apparatus 131 receiving a hot PnP event from the mass storage device, the event processing apparatus 133 may be configured to inform an upper layer storage medium access driver, such as a SCSI driver, of the hot PnP event.

In another exemplary embodiment, when the hot PnP event involves adding a logical unit, the event requesting apparatus 132 further may be configured to send an inquiry request to the newly-added logical unit of the mass storage device 12 individually.

Furthermore, when the LUNs in a logical unit table are not consecutive, the event requesting apparatus 132 may be configured to request a bitmap of the activated logical units from the mass storage device 12.

If the LUNs in a logical unit table are to be kept consecutive, when adding a logical unit the mass storage driver 13 may be further configured to assign a corresponding LUN to the added logical unit. Specifically, such newly-assigned LUN may be the new maximum LUN. When removing a logical unit, the mass storage driver 13 may be configured to reassign the LUNs of the remaining logical units as necessary so that the LUNs are arranged sequentially. For instance, if the LUN of the removed logical unit is not the maximum LUN at the time of removal, the mass storage driver 13 may be configured to move forward the LUNs of the remaining logical units that had been subsequent to the removed logical unit so that the LUNs of the logical unit table are arranged sequentially.

In another exemplary embodiment, when the event receiving apparatus 131 receives SCSI status information from the mass storage device 12 indicating that a problem (e.g., an invalidated command) exists, the event requesting apparatus 132 of the mass storage driver 13 may be configured to request sense data (detailed information) on the problem from the mass storage device 12 and and also may be configured to perform further processing based on the returned sense data.

In another exemplary embodiment, a mass storage system may be provided comprising the above mass storage device 12 and the above mass storage driver 13. When a logical unit of the mass storage device is added or removed, the logical unit may be dynamically managed, and a corresponding hot PnP event may be generated and then may be sent to the mass storage driver, which in turn may add to or remove from its logical unit table according to the hot PnP event and may inform the SCSI driver. Such actions render the mass storage system capable of implementing support of hot PnP of a logical unit of the mass storage device and ensure the usability and reliability of applications using the system. The mass storage device 12, the mass storage driver 13, and the mass storage system may implement the method for adding or removing logical units of a mass storage device according to the above description.

One skilled in the art can understand the above method, device, and system may be implemented by using computer-executable instructions and/or by being incorporated in processor control codes that are provided in a carrier medium such as a floppy disk, a CD or a DVD-ROM, a programmable memory such as an ROM (firmware), or a data carrier such as an optical or electrical signal carrier. The mass storage device, driver, and components thereof according to the various embodiments may be implemented by hardware circuitry, such as an ultra large scale integrated circuit (LSIC) or a gate array, a semiconductor device such as a logical chip or a transistor, or a programmable hardware device such as a field programmable gate array or a programmable logic device. The mass storage device, driver, and components thereof also may be implemented by software executed by various kinds of processing devices (e.g., a computing device). The mass storage device, driver, and components thereof also may be implemented by a combination of hardware circuitry and software (e.g., firmware).

While the method for adding or removing logical units of a mass storage device and the computer program product thereof, the mass storage device and the driver thereof, and the mass storage system are all described in detail above in conjunction with the exemplary embodiments, the disclosure is not limited to these embodiments, and one skilled in the art can understand that various changes, alternatives, and modifications may be made without departing from the spirit and scope of the disclosure.

The invention claimed is:

1. A method for adding or removing a logical unit of a mass storage device connected to a host computer through a universal serial bus (USB) interface, the method comprising:
without disconnecting the mass storage device from the host computer:
dynamically managing a logical unit table associated with the logical unit, the logical unit table comprising one or more records, each record representing an activated logical unit of the mass storage device;
generating, by the mass storage device, a corresponding hot plug and play (PnP) event at the mass storage device in response to adding or removing the logical unit, the hot PnP event comprising a data communications message; and
informing the host computer of the hot PnP event,
wherein the mass storage device comprises one or more module of computer hardware and the host computer comprises one or more modules of computer hardware.

2. The method according to claim 1, wherein informing the host computer of the hot PnP event comprises a mass storage driver obtaining the hot PnP event from the mass storage device via request-response.

3. The method according to claim 2, further comprising informing a SCSI driver of the hot PnP event via the mass storage driver.

4. The method according to claim 1, wherein dynamically managing the logical unit table comprises allocating a new logical unit number (LUN) to an added logical unit in the logical unit table or deleting a LUN associated with a removed logical unit in the logical unit table.

5. The method according to claim 4, further comprising requesting a bitmap of activated logical units from the mass storage device via the mass storage driver when LUNs in the logical unit table are not consecutive.

6. The method according to claim 4, wherein if LUNs in the logical unit table are to be kept consecutive, the method further comprises at least one of the following:
when adding a new logical unit, assigning a corresponding LUN to the added logical unit; and
when removing an existing logical unit, if the LUN of the removed logical unit is not the maximum LUN at the time of removal, reassigning the LUNs of the remaining logical units so that the LUNs are arranged sequentially.

7. The method according to claim 1, further comprising:
detecting a command sent to a removed logical unit;
setting status information in the mass storage device;
invalidating the command;
generating information on the invalidated command; and
sending the information on the invalidated command to the host computer.

8. The method according to claim 1, further comprising setting a default control channel to a stall status at the mass storage device when an unknown command appears, the unknown command comprising a command unknown to the mass storage device.

9. The method according to claim 8, further comprising refraining from sending a request from the host computer to the mass storage device to inquire whether a hot PnP event exists at the mass storage device.

10. A mass storage device with a plurality of logical units, the mass storage device comprising:
a logical unit managing apparatus for, without disconnecting the mass storage device from a host computer, dynamically managing a logical unit table associated with logical units in response to adding a new logical unit or removing an existing logical unit, the logical unit table comprising one or more records, each record representing an activated logical unit of the mass storage device;

a hot PnP event generating apparatus for, without disconnecting the mass storage device from the host computer, generating a corresponding hot PnP event in response to the added or removed logical unit, the hot PnP event comprising a data communications message; and an informing apparatus for, without disconnecting the mass storage device from the host computer, informing a host computer of the hot PnP event through a USB, wherein the logical unit managing apparatus, the hot PnP event generating apparatus, and the informing apparatus each comprise one or more module of computer hardware.

11. The mass storage device according to claim 10, wherein the logical unit managing apparatus is configured to allocate a new LUN to an added logical unit in the logical unit table or to delete a LUN associated with a removed logical unit in the logical unit table.

12. The mass storage device according to claim 10, wherein the informing apparatus is configured to inform the host computer of the hot PnP event in response to a request of the host computer.

13. The mass storage device according to claim 10, further comprising a fault tolerating apparatus for, upon detection of a command sent to a removed logical unit, setting status information, invalidating the command, generating information on the invalidated command, and sending the information on the invalidated command to the host computer through the informing apparatus.

14. A mass storage driver, comprising:
an event receiving apparatus for receiving from a mass storage device a hot PnP event related to adding a new logical unit or removing an existing logical unit through a USB, the hot PnP event generated without disconnecting the mass storage device from a host computer; and an event processing apparatus for dynamically maintaining a corresponding logical unit table associated with logical units and informing a upper layer driver of the received hot PnP event, wherein the logical unit table comprises one or more records, each record representing an activated logical unit of the mass storage device, wherein the event receiving apparatus and the event processing apparatus each comprise one or more modules computer hardware executing one or more modules of computer software.

15. The mass storage driver according to claim 14, further comprising an event requesting apparatus for sending a request to the mass storage device to determine whether a hot PnP event exists.

16. The mass storage driver according to claim 14, wherein the event processing apparatus is further configured to inform a SCSI driver of the hot PnP event in response to the event receiving apparatus.

17. The mass storage driver according to claim 14, wherein:
the logical unit managing apparatus for dynamically managing the logical unit table allocates a new logical unit number (LUN) to an added logical unit in the logical unit table or deletes a LUN associated with a removed logical unit in the logical unit table.

18. The mass storage driver according to claim 17, wherein the event requesting apparatus is further configured to request a bitmap of activated logical units from the mass storage device when LUNs in the logical unit table are not consecutive.

19. The mass storage driver according to claim 15, wherein when the event requesting apparatus receives from the mass storage device status information regarding an invalidated command, the event requesting apparatus is configured to request information on the invalidated command from the mass storage device in response to the event receiving apparatus receiving status information from the mass storage device.

20. A computer program product for adding or removing a logical unit of a mass storage device connected to a host computer through a universal serial bus (USB) interface, the computer program comprising a storage medium, the storage medium storing computer-executable instructions that, when executed on a computing device, configure the computing device to carry out the steps of:
without disconnecting a mass storage device from the host computer:
dynamically managing a logical unit table associated with the logical unit, the logical unit table comprising one or more records, each record representing an activated logical unit of the mass storage device;
generating, by the mass storage device, a corresponding hot plug and play (PnP) event at the mass storage device in response to adding or removing the logical unit, the hot PnP event comprising a data communications message; and
informing the host computer of the hot PnP event,
wherein the mass storage device comprises one or more module of computer hardware and the host computer comprises one or more modules of computer hardware.

* * * * *